Nov. 7, 1967  R. S. WOOD  3,351,241
MEDICINE DISPENSER
Filed Aug. 4, 1966

INVENTOR
ROBERT S. WOOD
BY Mason, Fenwick & Lawrence
ATTORNEYS

United States Patent Office 3,351,241
Patented Nov. 7, 1967

3,351,241
MEDICINE DISPENSER
Robert S. Wood, Aldie, Va. 22001
Filed Aug. 4, 1966, Ser. No. 570,370
3 Claims. (Cl. 222—158)

The present invention pertains in general to fluid dispensing apparatus, and more particularly to a hand held device for accurately premeasuring medicine to be dispensed and including structure for subsequently dispensing the measured medicine from the same container.

An object of the present invention is the provision of a dispensing apparatus for administering medicinal or other liquids by first premeasuring these liquids in the dispensing apparatus and then dispensing them without waste.

Another object of the present invention is the provision of a fluid dispensing apparatus which provides a means for completely draining the apparatus, particularly where a small quantity of fluid is used, or at the terminal portion of the dispensing of any desired quantity of fluid.

Another object of the invention is the provision of a medicine dispenser which permits measuring of an exact dosage and then allows the dosage to be dispensed from the measuring instrument to the patient while lying in a prone position in bed.

Another object of the invention is to provide a light, simple and inexpensive device which may be used for self-administering of medicine which is simple, of compact shape and which may be marketed at low cost.

Other objects, advantages and capabilities of the invention will become apparent from the following description taken in conjunction with the accompanying drawings showing only a preferred embodiment of the invention.

Figure 1:
FIGURE 1 is a perspective view of the present invention being properly utilized in hand-held fashion.
Figure 4:
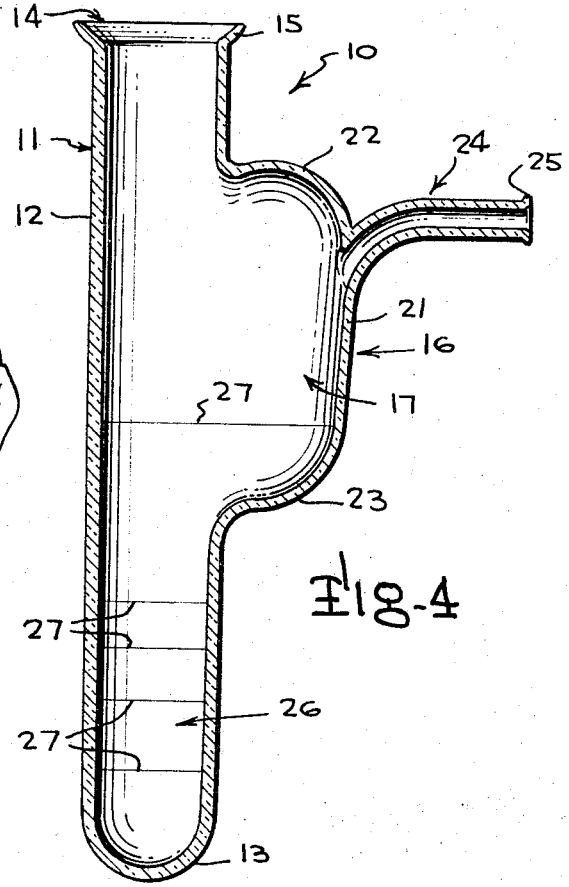
FIGURE 4 is a vertical section view taken along lines 4—4 of FIGURE 3.
Figure 2:
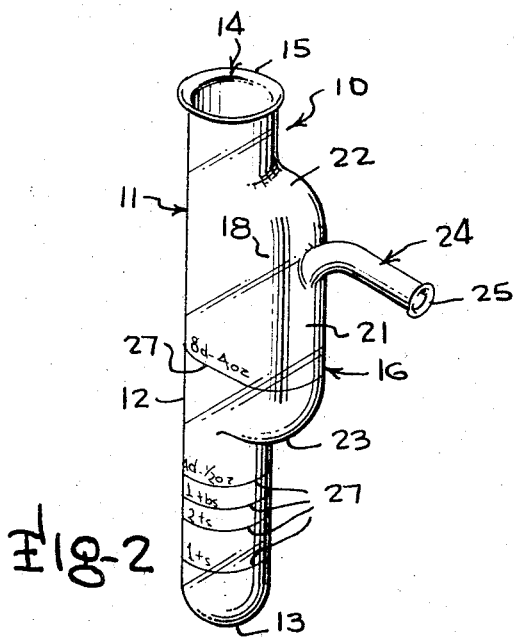
FIGURE 2 is an overall perspective view of the present invention.
Figure 3:
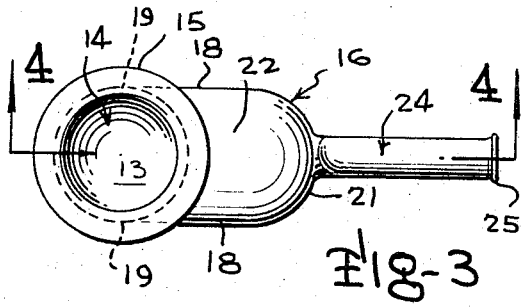
FIGURE 3 is a top plan view.

Referring to the drawings wherein like reference characters designate corresponding parts throughout the several figures, the medicine dispenser of the present invention is generally indicated by the numeral 10. The dispenser 10 generally comprises a tubular member 11 made of transparent material such as glass and having walls 12 which are of generally uniform diameter being closed by a rounded portion 13 at the bottom. The uppermost end 14 of the dispenser 10 is open and terminates in an outwardly extending annular flange 15.

Intermediate of the top 14 and the bottom 13 is an elongated protuberance 16 forming a dispensing reservoir 17. The protuberance 16 extends outwardly from the walls 12 of the tubular member 11 and comprises generally parallel sidewalls 18 intersecting at one end thereof at the wall 12 of the tubular member 11 in a tangential relationship indicated by numeral 19. The other end of the sidewalls 18 of the protuberance meet in a rounded endwall 21 and rounded top and bottom portions 22 and 23 respectively. The rounded top and bottom, along with the sidewalls of the protuberance, flare into wall 12 of the dispenser thereby forming, along with the endwall 21, the dispensing reservoir 17 which is completely open to the tubular member.

Near the upper portion of the protuberance 16 is a tubular dispensing spout 24 which projects, from a position intermediate the top 22 and the bottom 23, upwardly and outwardly from endwall 21 thereby forming a means to dispense the liquid to the patient. The outermost end of the spout 24 has an outwardly extending annular flange 25. The centerline of the free end of the spout extends generally perpendicular to the centerline of the tubular portion of the dispenser 10.

At the bottommost end of the dispenser 10 there is found a measuring reservoir 26 so that the fluid to be dispensed may be initially deposited in the reservoir 26 in the desired quantity. In order to effect precise measurement in reservoir 26, there is provided a plurality of indicia 27 upon the walls 12 of the tubular member 11. As is evident, the indicia may be of any desired configuration and may be so placed that they designate any desired quantity.

When using the medicine dispenser of the present invention, it is necessary only to grasp the dispenser in one hand and fill the measuring reservoir 26 with the desired quantity of fluid. Once the desired amount of fluid has been placed in the measuring reservoir 26, the free end of the tubular dispensing spout 24 is placed in the patient's mouth either by himself, or a second person, and then the dispenser is tilted toward a position that brings the centerline of the tubular member 11 closer to a horizontal position. Upon sufficient tilting of the tubular member, the fluid contained in the measuring reservoir 26 will flow into the dispensing reservoir 17 and thence to the dispensing spout 24. Because the dispensing reservoir 17 approximates the capacity of a major portion of the measuring reservoir 26, there is virtually no likelihood that the fluid will run out of the dispensing reservoir 17 by any means other than the spout 24.

While I have particularly shown and described one particular embodiment of the invention, it is distinctly understood that the invention is not limited thereto, but that modifications may be made within the scope of the invention and such variations as are covered by the scope of the appended claims.

What is claimed is:

1. An apparatus for accurately measuring and dispensing fluids comprising a tubular member with walls of generally uniform diameter and having a closed rounded bottom at one end, the other end being open and terminating in an outwardly flared annular flange, an elongated protuberance extending outwardly from the walls of the tubular member, the protuberance being located intermediate of the ends of the tubular member and having generally parallel sidewalls intersecting at one end thereof with the walls of the tubular member in a tangential relationship, the other end of the protuberance sidewalls meeting in a rounded end wall, the protuberance having a rounded top and rounded bottom flaring into the walls of the tubular member thereby forming with the sidewalls and the end wall a dispensing reservoir, means for dispensing fluid from the protuberance, the end and rounded bottom of the tubular member forming a measuring reservoir, indicia upon the measuring reservoir to allow accurate measurement of fluid placed in the reservoir, whereby when the tubular member is lowered toward the horizontal in the direction of the protuberance the enclosed fluid flows into the dispensing reservoir and subsequently into the dispensing means.

2. An apparatus for accurately measuring and dispensing fluids comprising a tubular member with walls of generally uniform diameter and having a closed rounded bottom at one end, the other end being open and terminating in an outwardly flared annular flange, an elongated protuberance extending outwardly from the walls of the tubular member, the protuberance being located intermediate of the ends of the tubular member and having generally parallel sidewalls intersecting at one end thereof with the walls of the tubular member in a tangential relationship, the other end of the protuberance sidewalls meeting in a rounded end wall, the protuberance having a rounded top and rounded bottom flaring into the walls of the tubular member thereby forming with the sidewalls and the end wall a dispensing reservoir, the tubular dispensing spout having parallel sidewalls projecting from a portion intermediate of the top and bottom of the dispensing reservoir upwardly and outwardly from the end wall of the dispensing reservoir, a free end of the tubular dispensing spout terminating in an outwardly extending annular flange, the end and rounded bottom of the tubular member forming a measuring reservoir, indicia upon the measuring reservoir to allow accurate measurement of fluid placed in the reservoir, whereby when the tubular member is lowered toward the horizontal in the direction of the protuberance the enclosed fluid flows into the dispensing reservoir and subsequently into the tubular spout.

3. An apparatus for accurately measuring and dispensing fluids as recited in claim 2 wherein the centerline of the free end of the dispensing spout lies in a plane generally perpendicular to the plane in which the centerline of the tubular member lies.

References Cited
UNITED STATES PATENTS

| | | | |
|---|---|---|---|
| 1,840,190 | 1/1932 | Dyck | 222—158 |
| 2,673,563 | 3/1954 | Kwast | 128—222 |

ROBERT B. REEVES, *Primary Examiner.*

H. S. LANE, *Assistant Examiner.*